March 26, 1963 F. THEUERKAUF 3,082,538
LEAD GAUGE DEVICE
Filed April 18, 1960 3 Sheets-Sheet 1

INVENTOR.
Fred Theuerkauf,
BY
ATTORNEY.

March 26, 1963  F. THEUERKAUF  3,082,538
LEAD GAUGE DEVICE

Filed April 18, 1960  3 Sheets-Sheet 2

INVENTOR.
Fred Theuerkauf,
BY
John A. Leonard,
his ATTORNEY.

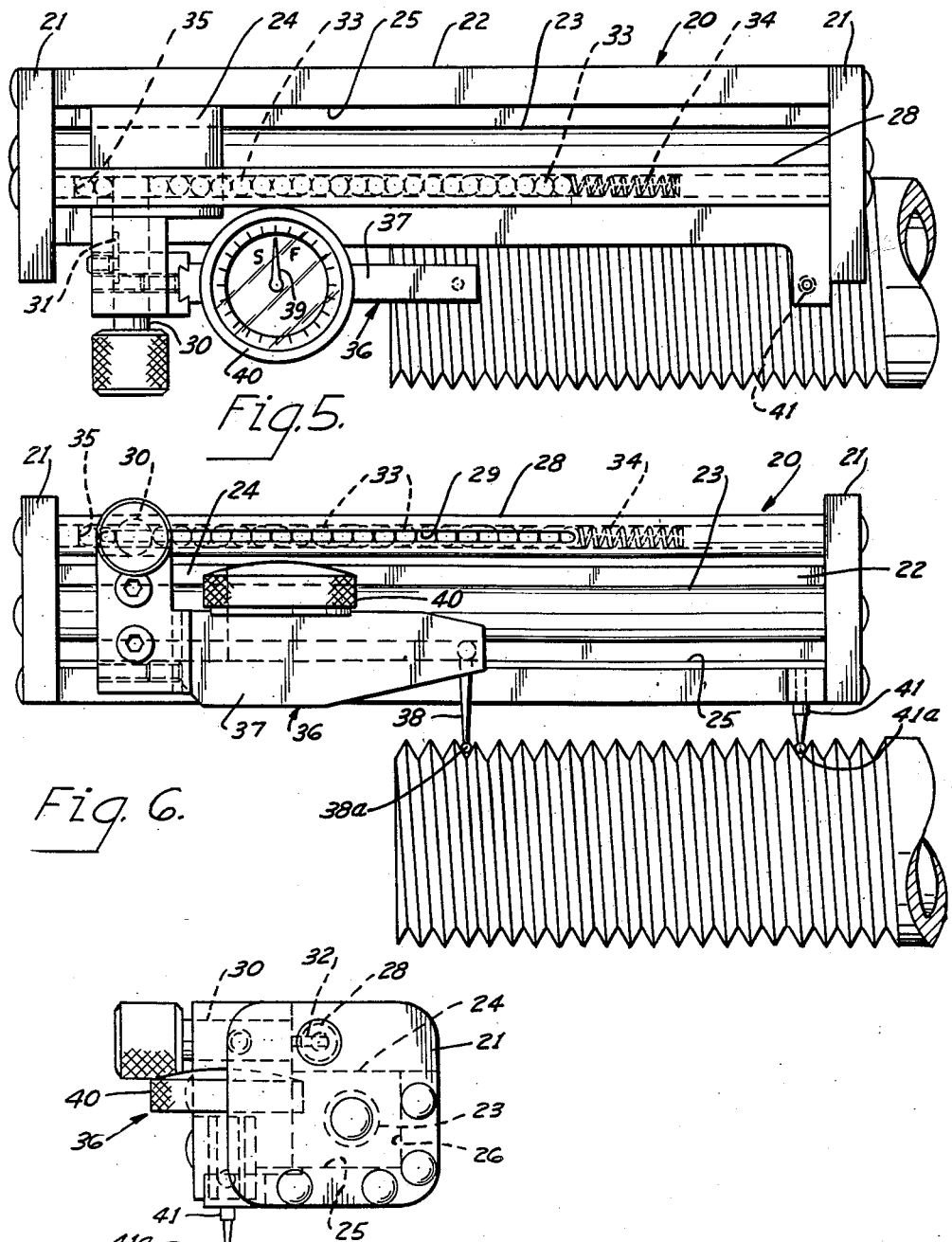

United States Patent Office 3,082,538
Patented Mar. 26, 1963

3,082,538
LEAD GAUGE DEVICE
Fred Theuerkauf, Mentor Township, Lake County, Ohio, assignor to The Pipe Machinery Company, Wickliffe, Ohio, a corporation of Ohio
Filed Apr. 18, 1960, Ser. No. 23,011
5 Claims. (Cl. 33—199)

This invention relates to a lead gauge device for gauging the lead of a screw thread on a threaded member, and particularly to a lead gauge device by which the lead of each tooth on the threaded member can be gauged more accurately and directly.

The gauge device of the present invention is so arranged that it can be operatively associated with a member of which the thread is to be gauged for lead, and each successive tooth of the member, or any preselected group of teeth thereof, can be gauged readily directly to determine whether or not the lead is sufficiently accurate. As distinguished from prior gauges and practices, this accurate and direct gauging can be done without the usual mathematical computations involving the need for gauging the relation of the lead of the particular tooth in question to that of other teeth of the thread. It eliminates the necessity of gauging the teeth immediately adjacent each side of the particular tooth in question to determine whether a lead error is in that particular tooth or in a tooth immediately leading or following it, or in the teeth at the opposite end of a group from the tooth in question.

A specific object is to provide a device having master gauging shoulders and a lead gauge so arranged that one of the lead gauge gauging contacts can be engaged selectively with the teeth of the thread, one at a time, and the other of the lead gauge gauging contacts can be engaged with the master gauging shoulders, one at a time, in a manner such that one tooth and one shoulder are engaged concurrently and the tooth is related directly to the master gauge, instead of to the other teeth of the thread.

Various objects and advantages will become apparent from the following description, wherein reference is made to the drawings, in which:

FIGS. 5, 6 and 7 are a top plan view, front elevation, and right end elevation, partly in section, of a modified form of the lead gauge device.

Figure 1:
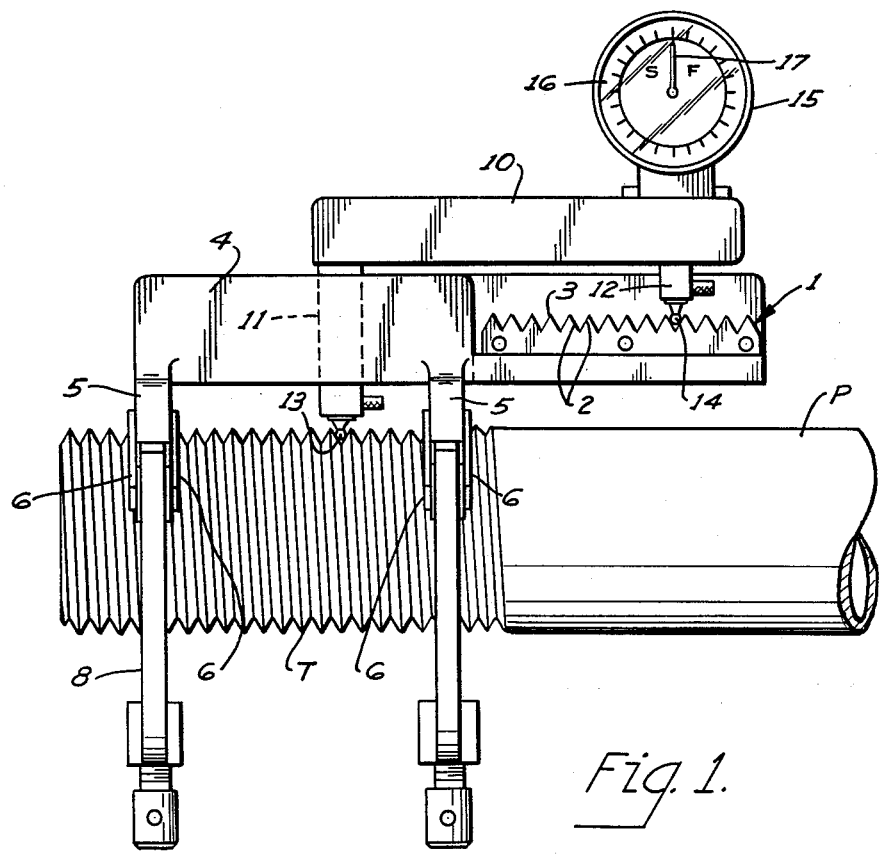
FIG. 1 is a front elevation of a lead gauge device embodying the principles of the present invention, the device being shown in cooperation with a threaded pipe of which the thread is being gauged.
Figure 2:
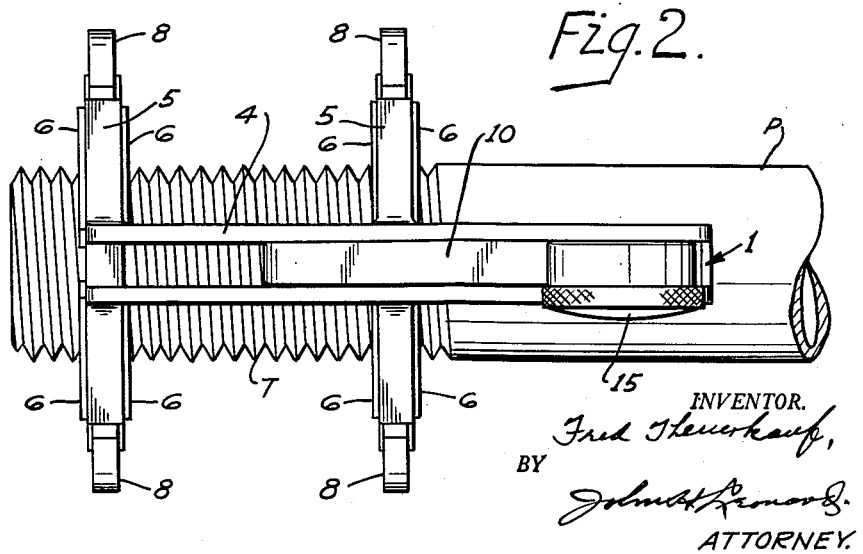
FIG. 2 is a top plan view of the device illustrated in FIG. 1.
Figure 3:
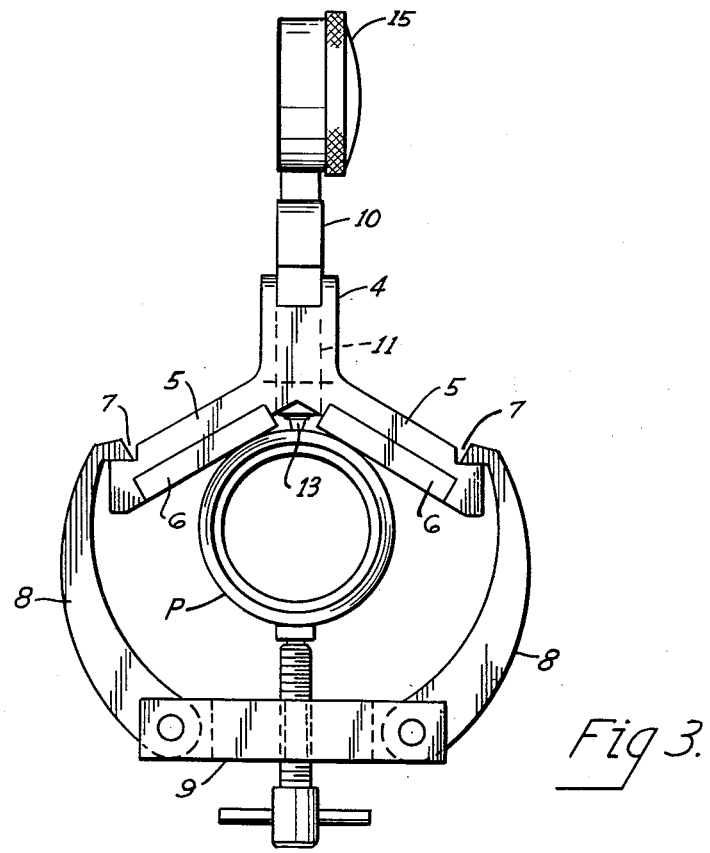
FIG. 3 is a left end elevation of the device illustrated in FIGS. 1 and 2.

The device is shown in operating position on a threaded member P, such as a pipe, having a thread T.

The device comprises generally a master gauge element, indicated generally at 1, having a plurality of gauging shoulders 2 which are arranged in pairs with the shoulders of each pair facing each other. These shoulders are arranged in spaced relation to each other in a row extending endwise of the element. Preferably, they are in the form of the lateral or flank wall areas of a row of precisely formed thread profiles 3, taken at the pitch line of the thread teeth represented by the profiles, and representing corresponding flank areas of teeth of a thread which is the same type and size as the thread to be gauged and which is as nearly theoretically correct as required by the degree of precision required for the particular work at hand.

The master gauge element 1 is mounted on a support 4 having two sets of legs 5, the sets being arranged in spaced relation to each other in a direction endwise of the row of shoulders 2. The legs of each set are spread apart laterally and shaped so that when they engage the surface of a cylindrical member P, such as a pipe, they support the master gauge element with the row of shoulders 2 facing away from, and in spaced relation to, the surface of the threaded member, and with the row parallel to a line defined by the bottom of troughs of the teeth of the thread T of the member on a plane through the axis of the thread T thereof.

The legs 5 are adapted to be detachably held firmly in fixed position on the member P during the gauging operation and for this purpose the legs may be provided with permanent magnets 6 of sufficient strength to grip the member P and firmly hold the support 4 in place. If desired, however, the legs may be clamped to the pipe or member. For this purpose, they may be provided with suitable notches, as indicated at 7, which can be engaged by clamp arms 8. The arms 8 are pivoted to a clamp body 9. For drawing the legs firmly into engagement with the peripheral surface of the member P by the arms, the body is provided with a conventional jackscrew which engages the member P at a location opposite from the gauge device.

A lead gauge of the conventional type is employed and is modified slightly in order to cooperate properly with the master gauge element. The lead gauge comprises a body 10 having near one end a fixed gauging contact 11. Near the other end, a movable gauging contact 12 is mounted for swinging movement toward and away from the contact 11. The contacts have gauging ends 13 and 14, respectively, each of which is hemispherical and adapted to be disposed against two adjacent side walls of two adjacent teeth of a thread concurrently in tangential relation to the pitch line of the teeth, as is well known in the art.

As is customary in such gauges, the movable contact 12 is yieldably held in a normal position in which its gauging end 14 is spaced from the gauging end 13 of the fixed contact in a direction endwise to the row a predetermined distance which is that of a preselected number of complete accurate teeth to be gauged.

The lead gauge also is provided with an indicator element 15 of the type which includes an indicating dial 16, a cooperable indicating arrow 17, and motion-magnifying means connecting the movable contact 12 and arrow 17 for magnifying the relative movement of the gauging end 14 of the contact 12 toward and away from the gauging end 13 of the contact 11 in a direction endwise of the body 10.

In such gauges, the arrow indicates the deviation in either direction from the normal spacing of the ends of the contacts 11 and 12, and, therefore, the deviation in the lead of the thread, whether the thread lead be more or less than normal.

The dial 16 is adjustable to zero position in any relative positions of the contacts 11 and 12.

The gauge thus described is well known in the art but is modified to the extent that one of the contacts is made longer than the other. In the illustrative example, the stationary contact 11 is made longer than the movable contact 12, but the contact 12 may be longer than the contact 11, if desired, and the gauge reversed in use.

The lengths of the contacts 11 and 12 are such that, with the gauge generally parallel to the row of shoulders 2, the end 14 of the contact 12 can be in gauging cooperation with any one of the selected shoulders 2 of the master gauge element 1 and the end 13 of the contact 11 in gauging cooperation with the thread T to be gauged.

Figure 4:
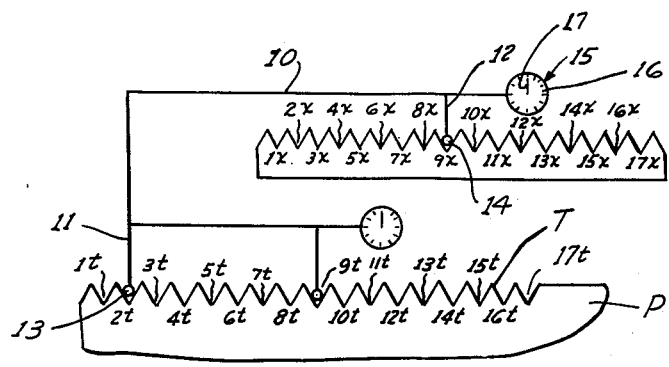
FIG. 4 is a comparative diagrammatic illustration of the conventional manner of gauging as practiced with a conventional lead gauge and the manner of gauging as practiced with the present device.

Referring to FIG. 4, to use the present device, one starts by engaging the end 13 of contact 11 with the first full tooth 2t of the thread T, and the end 14 of the contact 12 with the shoulder 2 nearest to it, which, in FIG. 4, is shown as 9x. In this gauging position, the dial 16 is set so that the arrow 17 points to zero. This setting provides a reference datum for gauging the lead. Thereafter, if the gauge element 10 is moved to the right so as to engage the contact 11 with tooth 3t, the contact 12 will then be in engagement with the shoulder 10x on the master gauge. Therefore, any deviation in lead from the datum registered for the tooth 2t and shoulder 9x is in the tooth 3t. By engaging the contact 12 with different shoulders 2 of the master gauge and the contact 11 with the nearest corresponding tooth of the thread T, each of the teeth of the thread T can be gauged individually. Accordingly it can be determined readily to what extent the lead of each thread deviates from what the total lead from the end of the pipe, up to and including that thread, should be.

The lead of a thread may vary from plus to minus for two consecutive teeth. These variations may cancel each other out in whole or part so that the total deviation of a given tooth relative to adjacent teeth may be more or less than the accumulated total deviation. However, this does not interfere with determining the deviation of any tooth relative to the leading and trailing tooth next adjacent to it, because the shoulders 2 are accurately spaced. For example, one can gauge a selected tooth of the thread T and gauge it for total deviation, then set the dial to zero and gauge the next adjacent leading or trailing tooth and read the deviation from normal of the next tooth. Instead of setting the dial to zero, the total deviation for the first gauged tooth and that for the adjacent tooth may be observed by the difference in indication on the dial.

Again, assuming one desires to gauge a group of eight teeth, for example, 2t through 9t, the contact 11 is engaged with tooth 2t and contact 12 with shoulder 9x and the dial set to zero. The gauge is next moved to engage contact 11 with tooth 9t and contact 12 with shoulder 17x. Since shoulders 9x to 17x have the precise and correct spacing for proper lead, any deviation indicated in the second position of the gauge element indicates the true lead error in the eight teeth 2t through 9t.

By reference to FIG. 4, this can be compared to the prior practice. Therein, contacts 11 and 12 would be engaged directly with teeth 2t and 9t, respectively. If the dial is set to zero, no true reference datum is provided unless it is assumed that the total lead of threads 2t through 9t is correct.

Next, if the gauge element 10 is moved to the right so as to engage the contact 11 with tooth 3t, contact 12 will engage tooth 10t of the member P. Any deviation registered may be due to an error in thread 3t, or thread 10t, or both. If the element is moved to the left, it will engage teeth 1t and 8t and indicate the deviation. But this may be due to tooth 1t or tooth 8t, or both.

There is, in fact, no fixed reference from which to check any tooth, or group of teeth, because there are no assuredly precise shoulders with which to compare the teeth.

Referring next to the modified form of the lead gauge device illustrated in FIGS. 5, 6 and 7, the device comprises an elongated frame, indicated generally at 20, comprised of end frame members 21 and longitudinal members 22 connected at their opposite ends to the members 21 so as to provide a rigid frame structure. Extending lengthwise of the frame and connected at its ends to the end frame members 21 is a tubular support 23 which provides a supporting slide for a carrier 24. The carrier 24 is arranged to slide lengthwise of the frame on the support 23 and is maintained in fixed position circumferentially of the support 23 by means of suitable guide surfaces 25 and 26 on the members 22. Thus, the carriage 24 maintains a fixed position circumferentially of the tubular support 23 while being freely slidable therealong.

Also mounted on the frame 20 is a master gauge element which is in the form of a thick walled tube 28 having in its forward face an elongated slot 29 which extends endwise of the tube. Mounted on the carriage 24 is a pin 30 which extends transversely of the frame and is reciprocable within, and axially of, a suitable bore in the carrier 24. A detent 31 restrains the pin 30 from withdrawal from the bore in the support and also constrains it from rotation about its own axis. At its inner end, the pin 30 has a flattened portion 32 which extends through the slot 29 and into the interior of the tube 28.

Arranged within the tube 28 is a row of gauging shoulders. These may be the same as those hereinbefore described. However, a suitable row can be provided by a plurality of balls 33. The balls are of the same diameter and all very accurate dimensionally.

These balls fit the accurately finished bore of the tube 28 with slight operating clearance, and are pressed toward the left end of the tube 28, in FIG. 5, by means of a spring 34. The row of balls is thus yieldably pressed against an abutment 35 in the bore of the tube. The carrier 24 may be slid to different positions along the tube 28 and the pin 30 pressed inwardly until its flattened end 32 engages between a pair of adjacent balls and spreads them apart. This positions the carrier 24 a fixed distance from the end member 21. In this position it is yieldably held by the spring 34.

Mounted on the carrier 24 is a gauge, indicated generally at 36. This gauge includes a rigid arm 37 which is secured in fixed position to the carrier 24 so as to extend endwise of, and parallel to, the tube 28. Mounted on the arm 37 is a movable contact arm 38 having at its lower end a contact 38a of ball shape adapted to engage two adjacent teeth of a thread at their pitch line. The arm 38 is connected by conventional motion multiplying means to an indicator needle 39 which indicates the deflection of the contact 38a endwise of the frame 20 out of its normal position, all in a well known manner and as hereinbefore described.

An indicia dial 40 is mounted on the gauge and is rotatable about its axis to different zero positions relative to the needle 39.

Mounted on the frame 20 at the end opposite from the carrier 24 is a positioning arm 41 which is in fixed position relative to the frame. The arm 41 normally extends parallel to the arm 38 and is provided at its lower end with a contact 41a adapted to engage two adjacent teeth of a thread at their pitch line.

If the carrier 24 is secured in fixed position endwise of the frame 20, then the arm 41 can function as a stationary contact arm so that the gauge can register any variations in the distance between the contact 41a and the contact 38a. Thus to gauge the lead of a thread in accordance with prior practice, the contact 41a would be disposed between two adjacent teeth with its axis substantially radially of the pipe and the contact 38a would be disposed between two adjacent teeth spaced from the first two teeth. Thereupon, the frame 20 is swung about the axis of the arm 41 back and forth in a plane normal to the axis of the arm 41. By this motion, the needle 39 of the gauge is caused to swing back and forth past a zero point on the gauge. Thereupon, the dial 40 is rotated about an axis of the needle to zero the indicia, when the entire frame is parallel to the pitch line of the teeth on a plane through the axis of the pipe.

Having "zeroed" the gauge in this manner, the contact 41a is moved to the next selected pair of teeth on the pipe and the contact 38a is caused to engage a corresponding pair spaced essentially the same distance from the selected pair as the first pairs were spaced from each other. Whereupon, the swinging operation is repeated and the variation between the two gauged readings obtained. In accordance with this prior practice, however, this variation in the readings may have been occasioned by variation in the teeth to which the contact 41a was moved, or the teeth to which the contact 38a was moved, or partly to both. Thus, two possibilities were presented as to where the inaccuracy in lead lay. A number of lead measurements would be required, as hereinbefore described, to determine wherein the inaccuracy lay.

In accordance with the present invention, however, the contact 41a no longer acts as a gauging contact but merely as a means for assuring proper alignment of the gauge 36 with the pipe thread. This alignment is that wherein the contact 38a will always engage the teeth at their pitch line in a plane defined by the axis of the pipe and axis of the arm 41. Thus the arm 41 and contact 41a perform a new function of an aligning means, rather than their original function of lead gauging.

With the device herein modified, the contact 41a is engaged between two teeth and thereafter all gauging is done with the contact 41a between this same pair of teeth. Instead of shifting the contact 41a from tooth to tooth, carrier 24 and the pin end 32 are shifted from place to place along the frame. The amount of shifting is precisely determined by the number of balls between the pin end 32 and the abutment 35 at the left end of the tube 28. The balls 33 are very carefully selected so that the diameter of one ball equals exactly the lead for one convolution of the thread. A different tube 28 and balls 33 may be used for threads of a different lead.

Thus, the contact 38a and the flattened portion 32, of the pin 30, become the movable and stationary contacts, respectively, of the device, comparable to the contacts 12 and 13, respectively, hereinbefore described. The contact 41a becomes merely an aligning means.

For using the device in the manner herein described, the contact 41a is disposed between two adjacent selected teeth and the carrier 24 is set at the desired position, depending upon the teeth to be gauged for lead. The contact 38a is placed between the two adjacent teeth to be gauged. In this position, the frame 20 is swung about the axis of the arm 41 back and forth until the zero position of the needle is obtained, whereupon the indicator dial 40 of the gauge is "zeroed" on the needle at this position.

Having thus provided a datum from which to begin to gauge a preselected tooth for lead, the pin 30 is pulled out of contact with the balls and the carriage 24 is slid along the frame 20 an amount corresponding substantially to the distance required for the next tooth to be gauged. Thereupon the pin 30 is pressed inwardly, its flattened end 32 engages between two adjacent balls corresponding to the tooth to be gauged. This positions the carrier a predetermined number of balls from the abutment 35 corresponding to a definite number of teeth. Thereupon the frame is swung to and fro again about the axis of the arm 41 until the needle indicates the new zero point. The variation between the new zero point and the zero point originally established indicates the cumulative error in lead from the thread first gauged to the threads being gauged.

Thus the contact 38a corresponds to movable contact 12 in the gauge heretofore described and the flattened end portion 32 corresponds to a stationary contact 13 of the gauge hereinbefore described.

The arm 41 and contact 41a, together with the movable contact 38a, provide the aligning means provided by the legs 5 in the form of structure illustrated in FIGS. 1 through 4.

Thus, by swinging the frame about the axis of the arm 41, movable contact 38a can be brought to gauging position with respect to the teeth. Successive teeth can be gauged at their pitch line in the same plane through the axis of the pipe and through the axis of the arm 41 merely by shifting the carrier 24 along the frame while placing the contact 41a always between the same two teeth of the thread.

Having thus described my invention, I claim:

1. A lead gauge device for gauging the lead of a screw thread on a threaded member and comprising a master gauge element having master gauging shoulders arranged in a row in predetermined spaced relation to each other and corresponding precisely to the lead of a thread to be gauged, supporting means for supporting the master gauge element in alignment with a threaded member wherein the row of shoulders is generally parallel with the line defined by the pitch line of the thread teeth on a plane through the axis of the thread, a lead gauge, a first contact thereon, a second contact movably mounted on the gauge for movement toward and away from the first contact and yieldably held in a normal position in which its gauging portion is spaced from the gauging portion of the first contact in a direction endwise of the row a predetermined distance which is that of a preselected number of complete accurate teeth to be gauged, said contacts being arranged for movement endwise of the row with the lead gauge, and, when the master gauge element is so supported, said contacts can be moved with the lead gauge transversely of the member so that one contact is carried into and out of proper gauging engagement with teeth of the member, selectively, and the other contact is carried into and out of gauging engagement with a corresponding one of said shoulders, selectively, and motion magnifying indicator means on the gauge and operatively connected to the second contact so as to indicate deviation of the contacts from said normal position.

2. The structure according to claim 1 wherein the supporting means are adapted to engage the threaded portion of the member at spaced locations therealong and thereby support the element fixedly in said alignment.

3. A lead gauge device according to claim 1 wherein the shoulders of the master gauge element are flank walls of a row of precisely formed tooth profile portions corresponding at the areas to be engaged by their associated one of the contacts to the corresponding areas of the flank walls of the teeth of a theoretically correct thread, and said shoulders are in fixed position relative to the supporting means.

4. A lead gauge adapted for gauging the thread of a threaded member while the member is held in fixed position, and comprising a master gauge element, a row of gauging shoulders on the element, a lead gauge, a first contact on the lead gauge adapted to be engaged with, and disengaged from, said shoulders, selectively, a second contact on the lead gauge spaced endwise of the row from the first contact and movable endwise of the row relative to the lead gauge and first contact, and yieldably held in a normal position in which its gauging portion is spaced from the gauging portion of the first contact in a direction endwise of the row a predetermined distance which is that of a preselected number of complete accurate teeth to be gauged, said contacts being movable with the lead gauge endwise of the row, whereby one contact can be carried into and out of position for engagement with said shoulders, selectively, the other contact can be carried into and out of position for engagement with the threads of the member, selectively, and a motion magnifying indicator means on the gauge and operatively connected to the second contact for operation thereby so as to indicate deviation of the contacts from said normal position when one contact is in engagement with the shoulders and, concurrently, the other contact is in engagement with the threads.

5. A lead gauge according to claim 4 wherein the row of gauging shoulders is a row of balls of the same diameter, a lineal guideway constrains the balls in the row, a fixed stop is provided at one end of the row for arresting movement of the balls in a direction toward the stop, and resilient means are provided at the other end of the row and yieldably hold the balls in contact with each other and urge them towards the stop.

References Cited in the file of this patent
UNITED STATES PATENTS

| | | |
|---|---|---|
| 1,286,224 | Byrd | Dec. 3, 1918 |
| 1,904,130 | Garms et al. | Apr. 18, 1933 |
| 2,144,972 | Hirst | Jan. 24, 1939 |
| 2,974,418 | Stimson | Mar. 14, 1961 |